United States Patent [19]

Rossi et al.

[11] Patent Number: 5,202,886
[45] Date of Patent: Apr. 13, 1993

[54] SYSTEM AND MULTIPLEXER/DEMULTIPLEXER FOR THE TRANSMISSION/RECEPTION OF DIGITAL TELEVISION INFORMATION

[75] Inventors: Alessandra Rossi, Vicenza, Italy; Antonio Campos, Madrid, Spain

[73] Assignee: Alcatel Telettra S.p.A., Milan, Italy

[21] Appl. No.: 605,969

[22] Filed: Oct. 30, 1990

[30] Foreign Application Priority Data

Oct. 31, 1989 [IT] Italy .............................. 22230 A/89

[51] Int. Cl.$^5$ .............................................. H04J 3/22
[52] U.S. Cl. ....................................... 370/112; 370/84; 370/94.2; 370/100.1; 370/105.1
[58] Field of Search ................. 370/105.1, 94.2, 84, 370/112, 100.1

[56] References Cited

U.S. PATENT DOCUMENTS

| | | | |
|---|---|---|---|
| 4,045,618 | 8/1977 | Lagarde et al. | 370/105.1 |
| 4,589,108 | 5/1986 | Billy | 370/84 |
| 4,939,723 | 7/1990 | Harley, Jr. et al. | 370/84 |
| 5,048,013 | 9/1991 | Eng et al. | 370/112 X |

*Primary Examiner*—Douglas W. Olms
*Assistant Examiner*—Russell W. Blum
*Attorney, Agent, or Firm*—Ostrolenk, Faber, Gerb & Soffen

[57] ABSTRACT

A system and related multiplexers/demultiplexers for the transmission/reception of digital television information (video+audio), including high definition information (HDTV). Such transmission typically occurs in packets at various work speeds including, among others, a special transmission in which two data flows are transmitted simultaneously to obtain a single information. The multiplexer is associated with external buffers that receive the data at different speeds, form the packet and generate requests of transmission to the multiplexer that receives them according to preestablished priorities.

8 Claims, 6 Drawing Sheets

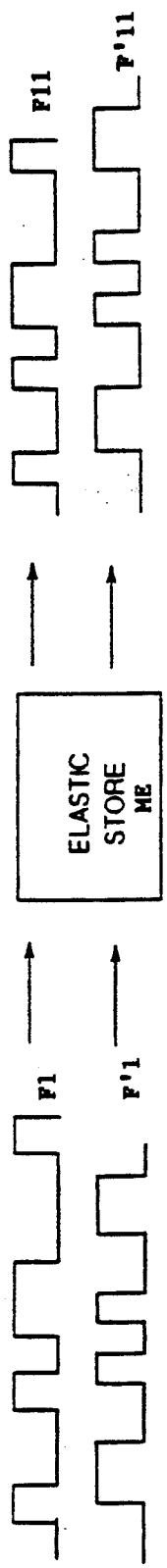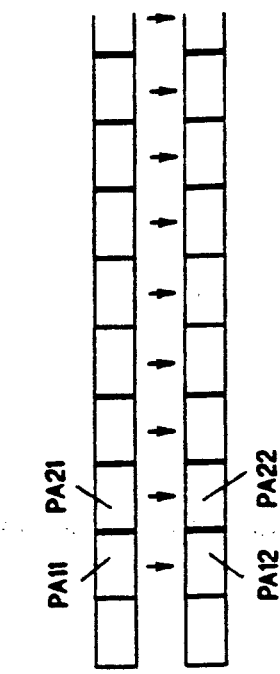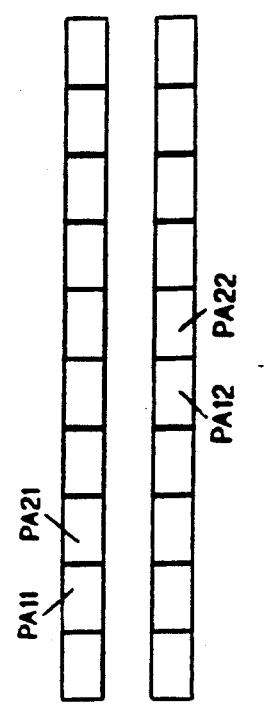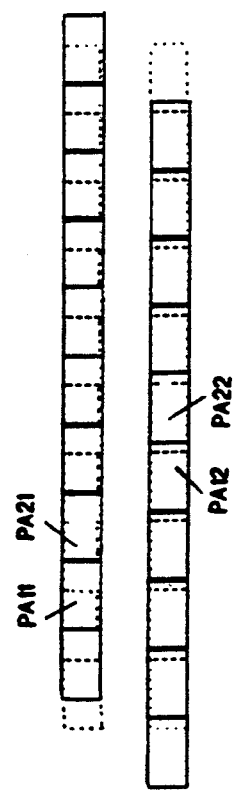
FIG. 4
FIG. 5
FIG. 6

SYSTEM AND MULTIPLEXER/DEMULTIPLEXER FOR THE TRANSMISSION/RECEPTION OF DIGITAL TELEVISION INFORMATION

BACKGROUND OF THE INVENTION

1. Field of the Invention:

The present invention relates to a system for the transmission/reception of digital television information (video+audio), in particular for high definition television information (HDTV). The invention also relates to the multiplexers/demultiplexers used to implement such a system.

2. Description of the Related Art

Multiplexing/demultiplexing systems usually order the data in transmission at a fixed distance in the frame and separate the data in reception according to this preestablished sequence. In the case where the data must be transmitted at different speeds, the operations become more complex and the classic system cannot be used. Until today, a system suitable for solving this problem has not been available, due to the necessity of transmitting data in series at different speeds.

SUMMARY OF THE INVENTION

The first aim of the present invention is to provide a simple and efficient system for transmitting data at different speeds. A further objection of the invention is to provide a multiplexer/demultiplexer structure that is particularly suitable for such a system.

The system according to the invention is characterized in that the data at different speeds are no longer transmitted unchanged directly to the multiplexing stage, but instead they are collected externally to the multiplexer in packet forming means of preestablished structure; each time these means have formed a packet, they send a request to the multiplexing stage. The different sources are supplied with different priorities; therefore, in the case of contemporaneous transmission requests, the request coming from the packet source that is associated to higher priority is satisfied first.

BRIEF DESCRIPTION OF THE DRAWINGS

FIG. 4 shows the elastic memory (having variable reading and writing rates) for synchronizing the data flow from two different paths of words;

FIG. 5 shows the alignment generator which aligns the words from the two data paths;

FIG. 6 shows the system which provides delay compensation to align the packets of words from the two data paths;

DETAILED DESCRIPTION OF THE PREFERRED EMBODIMENT

Figure 1:
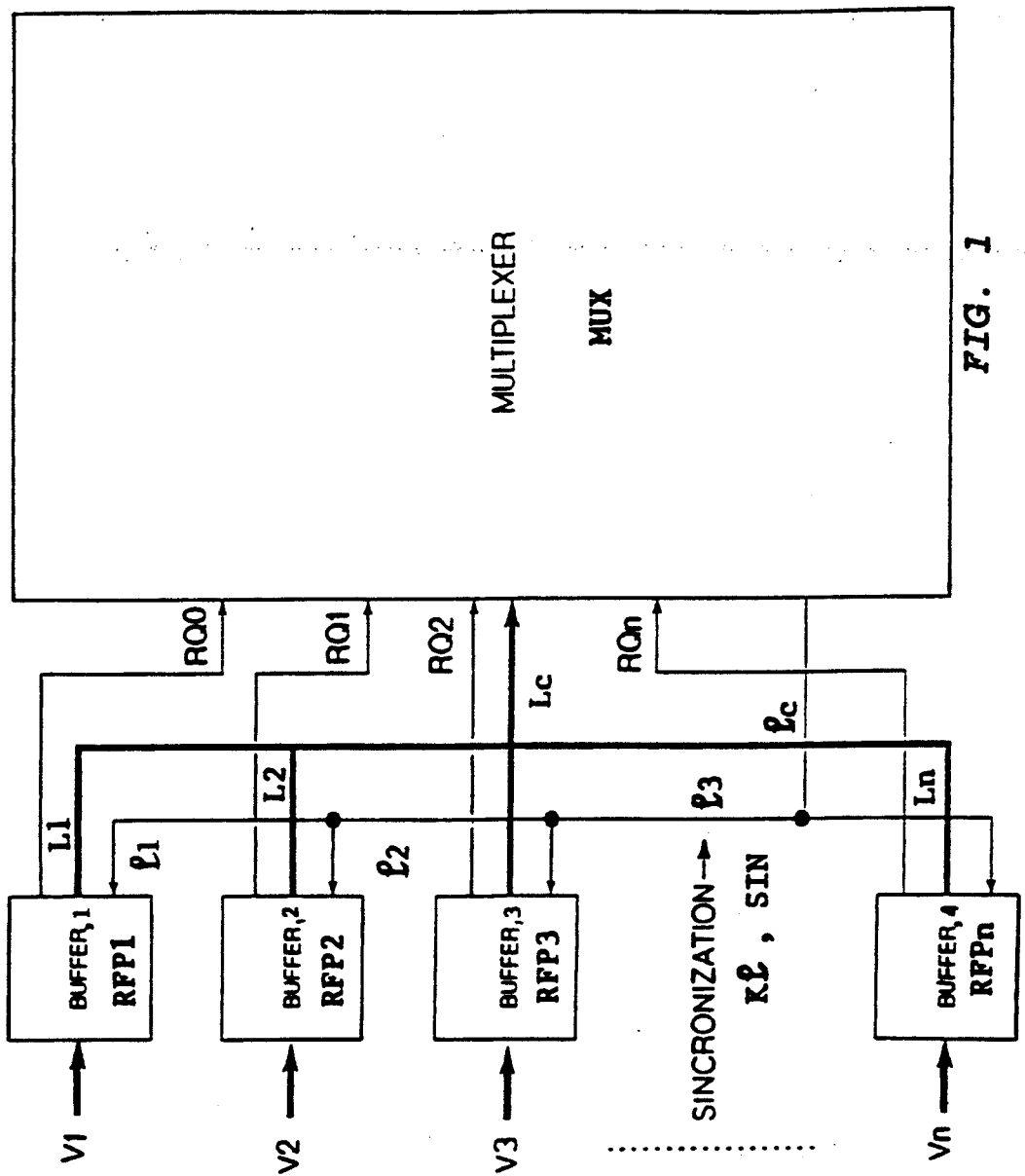
FIG. 1 is a block diagram of the transmission circuitry of the present invention.
Figure 2:
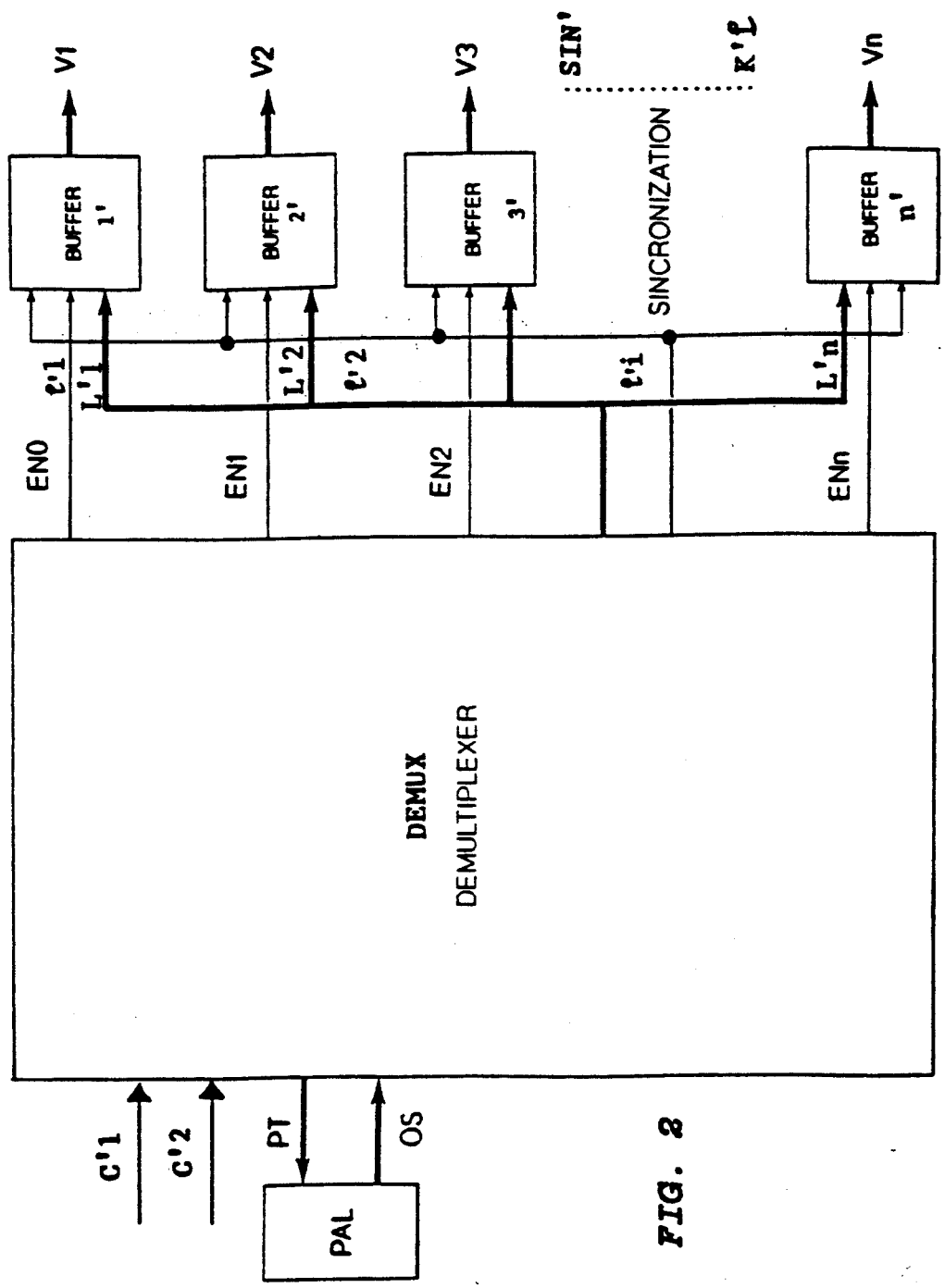
FIG. 2 is a block diagram of the reception circuitry of the present invention.

FIGS. 1 and 2 show the transmission and reception schemes of the system according to the invention. The data at different speeds V1, V2, ... Vn arrive separately to the packet collectors-formers RFP1, RFP2 ... RFPn, in this case formed by buffer stores 1, 2, 3 ... n, that are joined by means of the lines L1 ... Ln and the line in common with the multiplexer MUX. According to the invention, when one of the buffers (e.g. 1) reveals that a data number suitable to be transmitted exists, that is a number equal to the packet length, the request RQo to the MUX is generated for informing MUX that the packet is available and for having the consent for the transmission thereof. The MUX processes the request coming from RQo together with the possible other contemporaneous requests coming from RQ1 to RQn and, if these do not have higher priorities than the priority assigned to RQo, it allows the output of the data packet accumulated with speed V1 into the buffer 1. In the preferred embodiment, the higher priority corresponds to the audio data, followed by the fixed data of the video part. After these data are transmitted, the codes having a variable length coming from processors and, as last data, the data having the lowest speed and importance such as the telex transmissions, the ancillary data, etc. are transmitted. These priorities can be changed at any moment.

Each time the transmission request RQi is recognized, MUX generates the corresponding timings and synchronisms K1, and SIN;MUX communicates with the circuits forming the packets by means of the lines $l_1$, $l_2$, $l_i$.

The data transmission is carried out after a redundancy insertion for a future error correction is made by means of a FEC (Forward Error Corrector).

Figure 9:
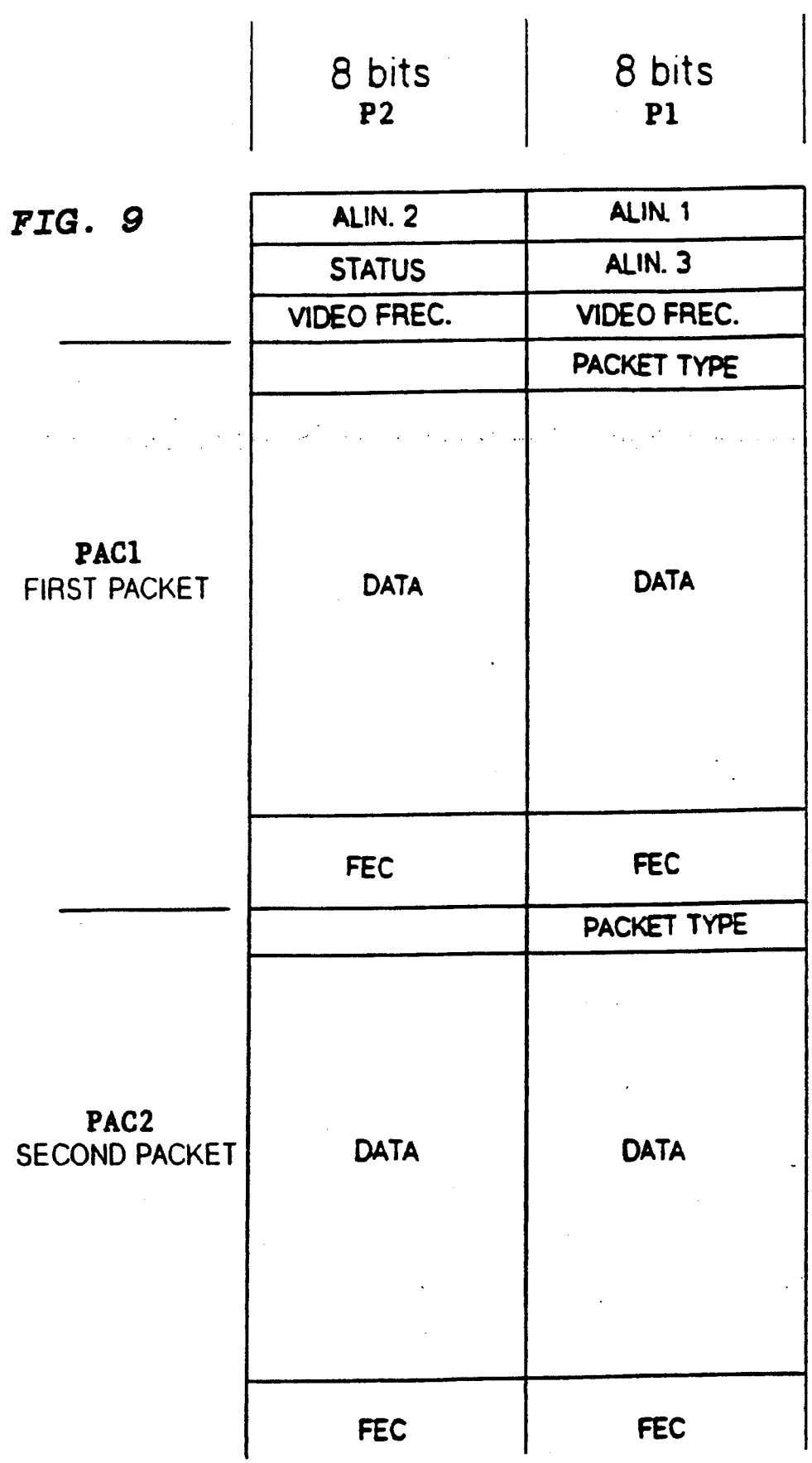
FIG. 9 shows an example of the contents of two packets of data sent along two paths.

In reception (FIG. 2), the circuit must recognize the buffer $1^{i'}$, $2^{i'}$ ... $n^{i'}$ to which each received packet is destined. For making this, the definition of the packet type held in the initial part of the same packet is used (as indicated in FIG. 9, that explains how the frame and packets must be formed) assigning well-established packet types to each area. For allowing the changing and programming of this information according to the future requirements of the total system, the output decision is not taken by the demultiplexer DEMUX in a fixed manner, but it provides the information, after having extracted it from the frame, to an external circuit deciding the destination of the same information PAL, using the bus PT. PAL decides in relation to the assignment table supplied case-by-case (that can be changed easily as indicated for the priority RQi) and provides the destination signal of the packet by means of the bus OS.

Depending upon the information sent by OS, the demultiplexer DEMUX decides the type of synchronism and timings K'1, SIN' that it must generate for the data output; these signals are transmitted onto the lines l'i, l'1 ... l'n, while the information is transmitted onto the lines L'1, L'2 ... L'n.

As data output speeds and, according to the quantity of information to be transmitted, the following channel speeds are used:

1 channel with 34 Mbits/s
2 channels with 34 Mbits/s
1 channel with 140 Mbits/s

The higher the speed, the better the signal quality, due to the obviously greater quantity of data that can be transmitted in the same transmission time interval. Considering the first two cases, all multiplexing/demultiplexing part is processed in the semicustom circuit, and considering the last case, due to the high speed of the final stages, the series-parallel or parallel-series conversions and the interfaces of the lines are done externally using ECL logic. The information distribution is based on frames (FIG. 9) formed by two data packets having 238 words of 16 bits, and further a first head word that holds the above mentioned definition of the packet type in the first 8 bits, the information being protected by a Hamming code, error corrector, and further 16 redundancy words of 16 bits for the error correction.

The frame is started with an alignment word of 24 bits, and further 8 bits that are be formed by a status word provided by an external system.

The continuation of the alignment word is formed by 16 bits of information, that is the information permitting the recovery of the video synchronism in reception. All of these data are transmitted in the form of words of 8 bits, even if they can be grouped in words having a greather or shorter length after the buffers.

In the case where a speed of 34 Mbit/s is used the running of mux/demux is similar to a normal system, except that the data transmission is carried out in packets and not according to a fixed sequence. The demultiplexing is made revealing the alignment word and, in the moment of the alignment acquisition, the initial heads of the packets are revealed and the information related to the area that must receive the transmitted packet is extracted. In the case where a speed of 140 Mbit/s is used the data are multiplexed in MUX, but the series and the line code conversions are applied externally to the circuit in the ECL logic for obvious reasons of work speed; in reception, the data enter in DEMUX, already transformed by parallel conversion, directly to the input elastic store and they follow the above said normal process. The more interesting part is that related to 2*34 Mbits/s, in which two independent channels C1, C2 (respectively C'2, C'2) are used for transmitting the whole information. Until today, to increase the data speed to be transmitted by a system, a higher data hierarchy was used with the associated necessity of using a transmission means having a higher frequency. This fact requires one to use, e.g. in the case of radio communications, higher and higher channels with the consequent problems of the increasing frequency, included in the microwave field.

In the preferred embodiment of the present invention, a speed of 2×34 Mbit/s with 8 bits words is advantageously used, but the following explanation refers to a generical system.

The system according to the invention allows one to use a well established hierarchy for transmitting information with double speed using two independent flows for the transmission of a single information. In this manner, the same type of (doubled) transmission means can be used without the necessity of having an access to other higher means.

Figure 3:
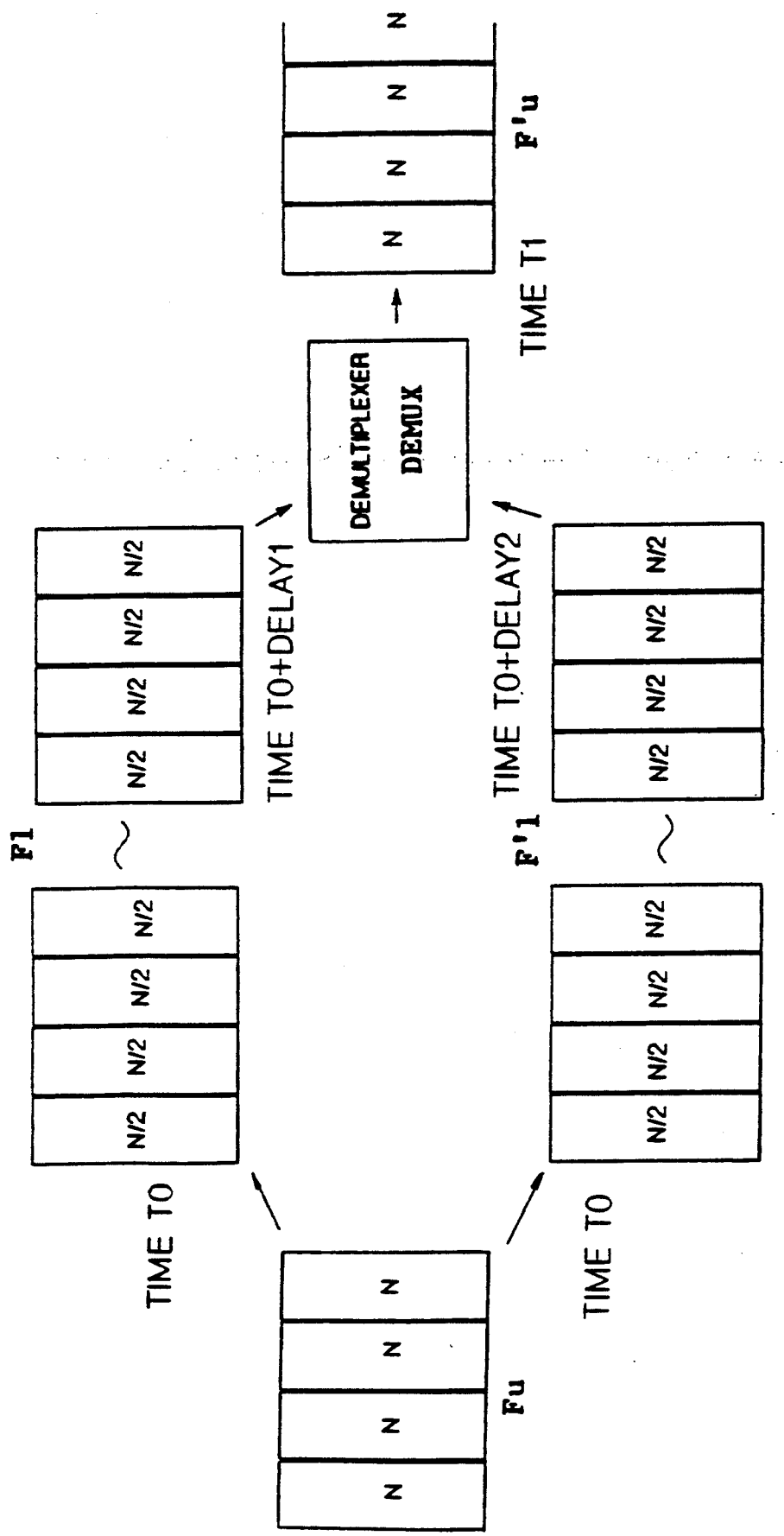
FIG. 3 shows the transmission of words having a length of N bits divided into two paths of words having a length of N/2 bits.

According to a feature of the invention, the information is divided in two flows, separating a part from the other part and rejoining these parts in reception to obtain the original information. To proceed in this manner, it is necessary to synchronize the two independent flows and compensate for the time differences between the flows for the different delays to which they are submitted due to the differences in the transmission means. FIG. 3 represents schematically the system according to the invention. In transmission, the word of N bits, Fri, is divided in two word of N/2 bits, F1, F'1. Due to the differences in the transission time TO and the delay changes, the two flows F1 and F'1 arrive with delays DELAY1 and DELAY2, in addition to the speed changes.

In reception, these changes must be compensated to return to the original words of N bits.

According to a feature of the invention, as an indication of the difference between the transmission times of the two flows, the information obtained from the time difference at the apparition of the alignment word is used.

In transmission, a channel C1 transmits the N/2 bits of greater weight of the word of N bits and the second channel C2 transmits the other N/2 bits of less weight (e.g. see FIG. 1). In reception, the following factors must be considered:

each channel has different delays; therefore the time differences between the two must be compensated, as stated above;

a revelation of the channel fixing each information can be added to increase performance.

This second possibility requires the introduction of an alignment word revelation different in each channel, generating a high or low channel indication. In this manner, the input channel changes are compensated automatically.

For compensating the delay, a more complex process is applied that can be understood better with reference to the FIGS. 4, 5 and 6. FIG. 4 shows the input flows F1, F1', that are introduced into an elastic store Me with different clocks. The name of elastic store means that it is a store where the reading-writing distance is variable, the data being introduced by means of a first clock and the data being read by means of a second clock. The aim of a memory of this type is to absorb the instantaneous changes of the writing clock and further, in the present invention, to synchronize the bits, as the writing foresees a clock for each flow, while the reading uses a same master clock in the two memories. Obviously, a PLL must be used for equalizing the writing and reading frequencies, for avoiding fillings and emptyings of the elastic store ME, that, as above said, must absorb the instantaneous changes. Therefore, the output of the elastic store shall provide two synchronized informations along the duration of bits, read in the two flows by the same clock, as shown in FIG. 4. Therefore, a synchronization at clock level and a new alignment at bit level is obtained. Each of the information (packets PA11 ... PA21; respectively PA12 .. PA22) is transmitted to an alignment detector that provides the words correctly aligned and formed as they were originally, due to the detecting of the alignment word, and so the right bit for each word being started can be known. Therefore at the input of the alignment generator RI, as shown in FIG. 5, two flows can be got (represented by the continuous line) that must be aligned correctly. The words are aligned correctly at output, but a time difference exists between the apparition of the alignment words in each flow. This difference supplies the mean value of the delay between the two frames that is compensated. Until this moment it had the word synchronism.

For understanding how the time difference is compensated, one flow must be defined as the master flow and the other flow as the slave flow. The master flow is the flow that was joined to the circuit clock frequency. The difference between the apparition of the alignment works in the secondary flow can be positive or negative with respect to the master flow, i.e., it can be in advance or delay. In other words, the time difference can be positive or negative. The time difference between the apparition of two alignment words is revealed. This difference must be compensated. To do this, the master flow is always delayed a fixed value T, so that the alignment word appears always at output shifted by T words after the detecting thereof.

The slave flow can be shifted in advance or in delay with respect to the other flow. For discovering this, the alignment detector starts a counter for each of the flows. At the moment in which the alignment word appears in the two channels, the time difference between the two channels is given by the difference between two counters CNT1-CNT2 (CNT1-counter of the master channel, CNT2-counter of the slave channel). This value can be positive or negative, according to whether the alignment word appeared in master channel or in slave channel for the first time.

This value is named D, so that:

$$CNT1 - CNT2 = D$$

As stated above, the master flow was delayed a fixed value T, therefore, at the instant t01, the alignment word appears in the master channel and in the instant t02, the same word appears in the slave channel. The difference between the two times shall be:

$$t01 - t02 = D*tp;  \qquad [1]$$

where tp is the duration of a word.

The alignment word after the delay appears at the time t0t1, given by the expression:

$$t0t1 = t01 + T*tp;$$

The slave channel includes a delay TS that provides the output at the instant t0t2, given by:

$$t0t2 = t02 + TS*tp;$$

The solution that it looked for is that t0t1 = t0t2, from which:

$$t0t1 = t01 + T*tp \quad ]$$
$$\qquad \qquad ] \quad t01 + T*tp = t02 * TS*tp;$$
$$t0t2 = t02*TS*tp \quad ]$$
$$\qquad \qquad TS*tp = t01 - t02 + T*tp;$$

replacing [1]:

$$TS*tp = D*tp + T*tp;$$
$$TS = D + T$$

Therefore a variable delay line is used, in which it is assumed that the minimum value of TS=0, (to delay the signal of a negative number shall be equivalent to accelerate it), therefore:

$$D + T = 0;$$
$$-T < D < T$$

from which:

$$0 < TS < 2T;$$

In the present invention, the value of T was selected equal to 64 therefore, as words are treated, it a delay of 64*4 bit = 256 bit is present; TS being variable between 0 and 512 bit, that in the case of 2*34 Mbit/s provides time of bit equal to 1/34 /us and a delay compensation of 256*1/34,368 /us = 7.5 /us in advance or delay.

Comparing this value of total frame time, that should have a length (for this particular preferred embodiment):

$$2*(238*16+16+16*16)+2*16+16 = 8208 \text{ bits}$$

with a frame time for 2*34 Mbits/s equal to:

$$8208*1/(2*34.368) \text{ Is.} = 119.413 \text{ /us}$$

Expressing the compensation in other manner, it can be seen as:

$$256/8208 = 3.118\%$$

The embodiment of the variable delay line allows two variants:

memory in which the reading-writing distance fixes the delay thereof;

a shift register line, forming the delays of $2\hat{N}$ and selecting the delay to be applied by means of a multiplexer selection.

As a preferred embodiment, the second option was used, whose implementation is easier. A representation of the embodiment forms of the two options is visible in FIGS. 7 and 8, respectively.

At the output of the delay lines, the frame synchronism is obtained, by which, always considering that the delay difference between the two frames is lower than the fixed value, the two channels can be completely synchronized. In the case in which it is not possible to compensate the delay, an external alarm is generated.

This alarm must indicate only that the absolute value of D is higher than the maximum foreseen value.

As it can be noticed in FIG. 6, at output of the system SC of delay compensation, the two frames are completely synchronized and the sole action that must be done is to join the two words of N/2 bits in words of N bits for reconstructing the original information.

Another performance that is foreseen by the circuit is the possibility of working as a "repeater", introducing directly the data from another demultiplexer and using an external selection to replace the packets that are required in the point of the distribution network and inserting further the supplementary information in the packets that in transmission were let free just for realizing this possibility, as indicated above.

This is obtained by means of the data introduction by another bus and, in the case of revelation of a "replaceable" packet, it is replaced with one of the packets fixed externally.

Figure 7:
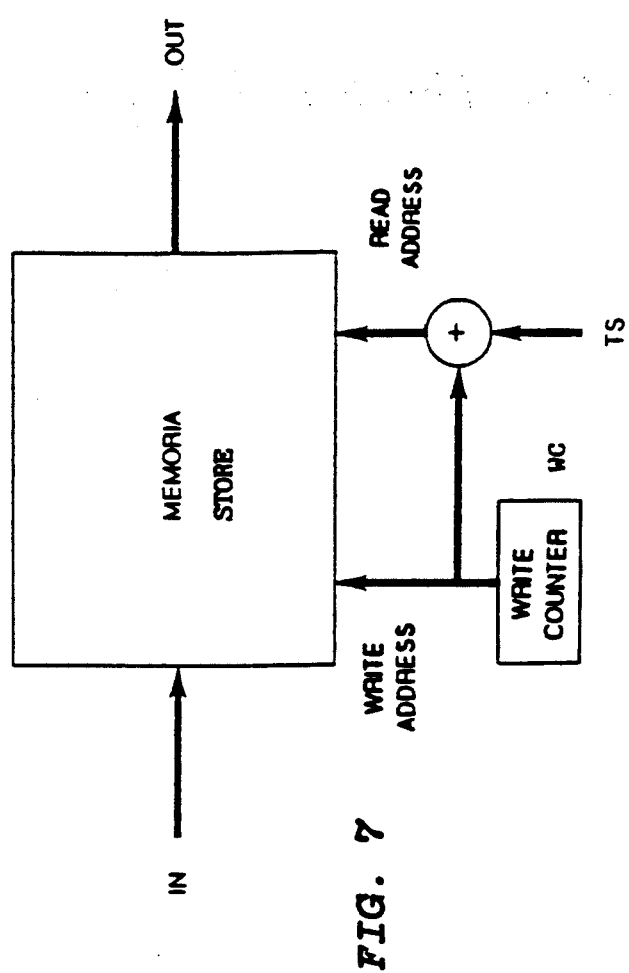
FIG. 7 shows a conventional variable delay line for providing the delay compensation of FIG. 6.
Figure 8:
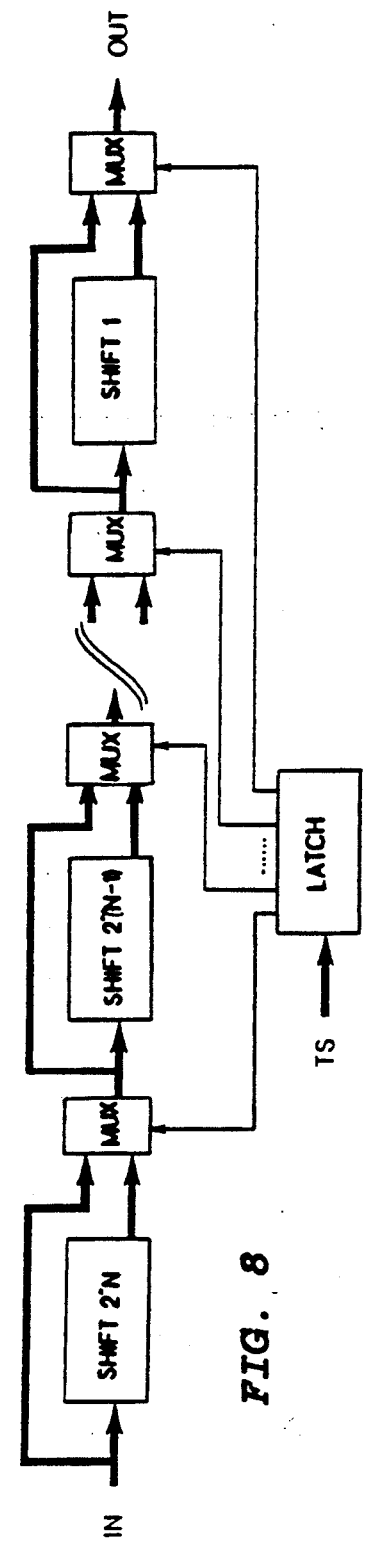
FIG. 8 shows a delay line formed of a series of multiplexers preceded by shift registers for providing the delay compensation of FIG. 6.

For better explanation:

FIG. 3 shows the flow fu formed by words having a N length, that at the time TO is divided in two flows F1 and F1' having words of N/2 length. F1 arrives to the demultiplexer DEMUX at the moment TO+delay 1, F'1 arrives AT TO+delay 2; DEMUX joins again F1 and F'2 compensating the respective delays 1 and 2 and forming again the original flow F'n of words having a N length;

FIG. 4 represents the elastic store ME that carries out the new alignment at bit level between F1 and F2 and the synchronization at clock level;

FIG. 5 represents the tester RI of synchronization and therefore at word level;

FIG. 6 shows the compensation system with new alignment at packet level;

FIG. 7 represents the variable delay line (for compensating the delay of FIG. 6) made with classic system, that is a store that receives the data in input IN and sends them at output OUT with a delay that is equal to the distance between reading and writing; for this purpose, the writing is controlled by the counter WC, whose counting, added with the delay TS, controls the reading;

FIG. 8 shows the delay line that is advantageously formed by a series of MUX preceded by registers that supply shifts $2N$, $2(N-1)$ ... respectively 1. The first MUX receives the signal at input IN, the signal from the register with shift $2N$ and the signal of a LATCH fed by the delay signal TS. Each of the MUXs following the first MUX receives the signals from the preceding MUX, from the decreasing shift register $2(N-1)$ etc. and from the LATCH;

FIG. 9 shows the formation scheme of two exemplary packets (first, second packet PAC1, PAC2).

A particularly simple and advantageous embodiment form foresees that the frame is really formed by two packets PAC1, PAC2 of 255 words formed each of 16 bits; the head of each packet foresees two words of 16 bits reserved to the alignment words (24 bits) ALIN1, ALIN2, ALIN3, and to the status word (STATUS) (8 bits) and further two 16 bit words for the video synchronism (VIDEO FREC). Each packet is protected by an error correction code (FEC). The first 16 bits of each packet hold the information related to the source from which the same packet comes (PACKET TYPE). The transmission from the buffer store Bi to the multiplexer MUX and from the demultiplexer DEMUX to the buffer B'i occurs by means of the 8 bit words (P1, P2). It was stated above that the multiplexer can run with three different speeds: 1 flow with 34 Mb/s; 2 flows with 34 Mb/s; 1 flow with 140 Mb/s. In the first two cases, all of the operations of a multiplexer-demultiplexer are advantageously made internally to the semicustom circuit, while in the third case the series/parallel conversion and the interface of lines are carried out externally by ECL logics owing to the very high speed. In the case that 2 flows with 34 Mb/s are used, the advantage of working with a frequency double of 34 Mb/s is obtained, the transmission speed of 34 Mb/s is used on two independent flows.

For getting the original information, the two flows are joined in reception in a correct manner, synchronizing the two input flows. The 8 bit words in transmission are divided in two 4 bit words (the most significant 4 sits and the less significant 4 bits), and transmitted independently. In reception, it is possible to recognize the most significant bits and the less significant bits (as it is necessary to recognize different alignment words) being possible, in this manner, to compensate eventual channel exchanges. The two received flows are recorded in two elastic stores with different writing clocks extracted from flows and are read with the same clock, that is, the one related to the master flow (FIG. 4). Then, an alignment generator RI (FIG. 5) is present in each path and, at the output of each alignment generator, a correctly aligned flow is obtained; as a time difference between the position of the alignment word can be present in a flow with respect to the other flow, it is compensated from the variable delay line SC (FIG. 6) so that, in the embodiment of FIG. 8, has registers are inserted by means of MUX. As indicated above, the system can run as a repeater, in which case the free packets are replaced with the desired packets. For purpose of illustrative clarity, the invention has been described with reference to the embodiment represented in drawings; obviously different variants, modifications and replacements and the like can be applied without departing from the spirit or scope of the invention.

We claim:

1. A system for transmitting data of TV, HDTV, audio and data signals that come from different sources, can have speeds different from one another and are fed to a multiplexer for transmission from a transmission side to a reception side, wherein, in transmission from the transmission side, the signals at different speeds are each accumulated into a respective buffer that forms a packet thereof and, when the packet is ready, sends to the multiplexer a signal enabling the transmission of said packet, the multiplexer transmitting the packets according to a prefixed priority order and adding to the packets a frame synchronization signal, the data in the packets being transmitted over at least two paths simultaneously so that the data can be transmitted at a speed within a range suitable for existing carrier waves; and, in reception at the reception side, said system distributes the packets to respective memories on each of the two paths and then carries out an alignment of the data on the two paths on the basis of the synchronization signal.

2. A system according to claim 1, wherein the multiplexer transmits the data in the packets along each path at a rate of 34 MB/s.

3. A system according to claim 1, wherein the system is run as a repeater.

4. An apparatus for implementing the system of claim 1, comprising:
   means for feeding data signals with different speeds to means forming data packets;
   a multiplexer for multiplexing and transmitting said packets one at a time over at least two paths;
   means for assigning the priority to said packets; and
   means for interrogating the multiplexer and for enabling the multiplexer to transmit the packet with the highest priority.

5. An apparatus according to claim 4, in which the transmission side includes a plurality of buffers in a number equal to the number of different speeds of data signals; one multiplexer; linkages between said buffers and said multiplexer suitable for generating the priorities; and synchronism and clock generators.

6. An apparatus according to claim 5, in which the reception side includes a demultiplexer which is associated with a circuit for packet decision and destination; a series of buffers, a linkage network from these buffers to the demultiplexer suitable for reestablishing the priorities and a system for synchronization and clock regeneration.

7. An apparatus according to claim 5, in which the data received at the reception side is split into two channels, each including one elastic store, one realignment generator and one delay trimmer.

8. An apparatus according to claim 7, in which the trimmer is a variable delay line preferably formed by a plurality of registers and multiplexers and one latch.

* * * * *